Patented June 4, 1935

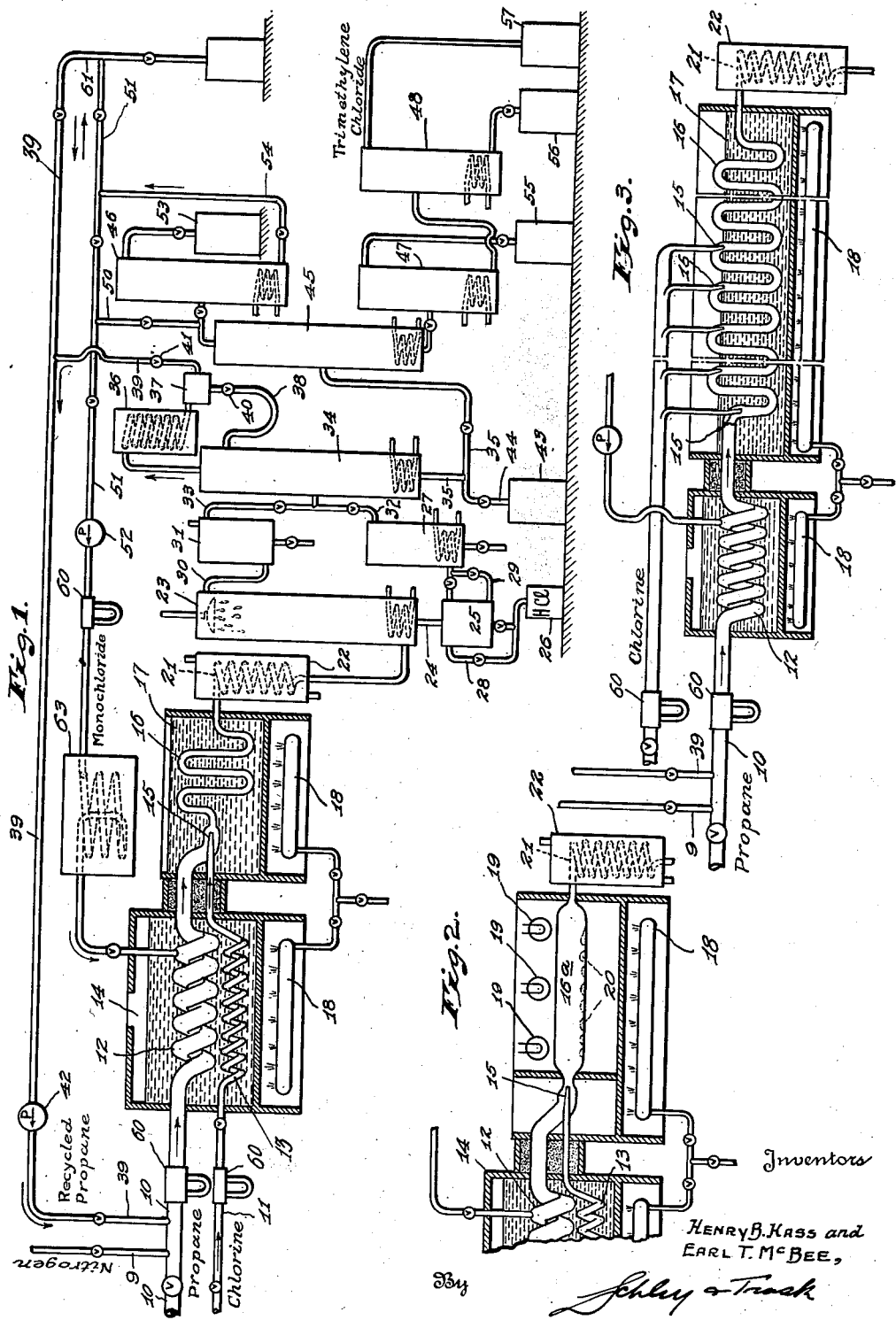

2,004,073

UNITED STATES PATENT OFFICE 2,004,073

PROCESS OF CHLORINATING PROPANE AND ITS PARTIALLY CHLORINATED DERIVATIVES

Henry B. Hass and Earl T. McBee, West Lafayette, Ind., assignors to Purdue Research Foundation, West Lafayette, Ind., a corporation of Indiana Application May 1, 1934, Serial No. 723,366

22 Claims. (Cl. 260—166)

It is the object of our invention to synthesize trimethylene chloride (1,3-dichloropropane) by the chlorination of propane.

While various hydrocarbons have been chlorinated, for many years, prior to our work very little has been done in chlorinating propane. Two-thirds of a century ago, in 1869, Schorlemmer did indeed report that he chlorinated propane, by the action of sunlight at room temperature on a gaseous mixture of chlorine and propane in a bell-jar; but, according to his report, the only dichloride obtained was 1,2-dichloropropane. (See summary in Chemical Reviews, volume 8, pages 1 to 80, year 1931, by Egloff, Schaad, and Lowry.)

Indeed, according to a commonly accepted rule for chlorination, (which rule is shown by our work to be erroneous,) the only dichloride obtainable by the chlorination of propane is 1,2-dichloropropane (propylene dichloride); so that according to that rule it was impossible so to obtain 1,3-dichloropropane (trimethylene chloride). That commonly accepted rule is with reference to the halogenation of alkyl halides—for in forming a dichloride of propane by chlorine substitution it is necessary to form first a monochloride—and is aptly summarized in the words of Herzfelder (quoted on page 4 of the summary above cited):

"When in a monohalogen compound, a second halogen atom is introduced, it always attaches itself to that carbon atom which is situated next to the carbon atom already united with halogen."

This supposedly universal rule has seemed to be supported by many reports. Thus: Shöyen, (ibid. p. 29,) in chlorinating n-butane, reported only "butylene dichloride" as a dichlorination product, and in any butylene dichloride the two chlorine atoms are necessarily on adjacent carbon atoms; Butlerow, (ibid. p. 30,) in chlorinating isobutane, reported only 1,2-dichloroisobutane (isobutylene dichloride) as a dichlorination product; and Schorlemmer, as already noted, when he chlorinated propane many years ago, reported only propylene dichloride (1,2-dichloropropane) as a dichlorination product. The Sharples Solvents Corporation (Bulletin "Chemicals Derived from the Pentanes") lists only 1,2-dichloropentane, 2,3-dichloropentane, and 2,3-dichloro-2-methylbutane, as dichlorides produced in the chlorination of a mixture of n-pentane and isopentane. In all these no dichlorination is reported in which chlorine is substituted on two non-adjacent carbon atoms of a paraffin hydrocarbon.

We have obtained in the chlorination of propane, in addition to 1,2-dichloropropane (propylene dichloride), a considerable amount of other dichlorides of propane; and have found that in these additional dichlorides 1,3-dichloropropane (trimethylene chloride) is not only present, contrary to the commonly accepted rule above referred to, but is the one which usually predominates. We have also found that by controlling the conditions we may increase the proportion of 1,3-dichloropropane; by carrying on the chlorination procedure wholly at high temperature, in the manner which has already been pointed out generically and in some specific cases in our co-pending application Serial No. 590,046, filed February 1, 1932, for increasing the ratio of primary substitution to secondary and/or tertiary substitution.

When propane is chlorinated, the variants in the chlorination products, up to and including dichlorides, are shown by the following:

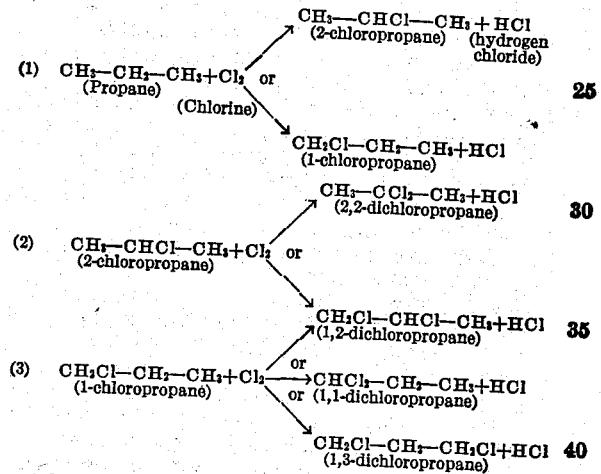

Thus 1,2-dichloropropane may be formed by the chlorination of either 1-chloropropane or 2-chloropropane.

If chlorine substitution occurs on the number 2 carbon atom of any propane molecule, however, in either the first step or the second step of the chlorination, it follows that 1,3-dichloropropane is not formed from that molecule. (Equation 2 thus yields no 1,3-dichloropropane.) Therefore, we prefer to operate under conditions which raise the proportion of chlorination of the primary carbon atoms, as by thermal chlorination at relatively high temperatures, to obtain maximum yields, first of 1-chloropropane, and second of the desired 1,3-dichloropropane. However, substantial amounts of 1,3-dichloropropane are obtained even at low temperatures; so that our process includes not only chlorination under optimum conditions for primary-carbon chlorination, as thermal chlorination, but also, either with or without thermal acceleration, a chlorination of propane under other conditions. Either photochemical or catalytic acceleration gives good results.

In thermal chlorination at relatively high temperatures, we prefer to heat both the chlorine and the propane or monochloride of propane separately to the desired reaction temperature, and to mix them at that temperature; for which purpose it is desirable, in order to prevent flame, that one of the gases be injected into the other at a high velocity, so that it enters in excess of the speed of flame propagation, and to have such injection with a turbulent flow which produces an intimate mixing which enables the ingredients to become uniformly dispersed in each other before any considerable amount of chlorination takes place; for this avoids the formation of undue amounts of highly chlorinated products, which are formed if the reaction occurs in the presence of a local excess of chlorine.

In the chlorination process, both polychlorinated products and monochlorinated products are obtained. By providing sufficient chlorine, at one or more jets, and re-cycling the monochlorides, the proportion of dichlorides to monochlorides obtained may be increased.

In any of these cases, the chlorination of propane yields chlorides other than the desired 1,3-dichloropropane (trimethylene chloride). These other chlorides, whether monochlorides or polychlorides, are desirably suitably separated from the desired 1,3-dichloropropane, conveniently by rectification. That can readily be done, with the single exception of one trichloride (1,2,2-trichloropropane), on account of the fairly wide differences in the boiling points involved; and the conditions of chlorination are so controlled that the production of trichlorides and particularly of that 1,2,2-trichloride is largely avoided. The desired 1,3-dichloropropane (trimethylene chloride) has a boiling point of 120°–121° C., (the boiling point of 125° C. commonly given in the literature is erroneous,) and the various monochlorides and the other dichlorides of propane all have boiling points at least 12° away from that temperature.

We may separate the 1-chloropropane from the 2-chloropropane obtained according to Equation 1, and also from any polychlorides which are produced at the same time; then recycle the 1-chloropropane to chlorinate it in accordance with Equation 3, desirably under conditions which yield a maximum amount of 1,3-dichloropropane; and then separate the 1,3-dichloropropane from other chlorides present.

The essential features of our process are the chlorination of either propane or 1-chloropropane, or both, to yield 1,3-dichloropropane; and the separation of that 1,3-dichloropropane from other chlorides present.

We may carry out our process with various forms of apparatus. One suitable form is essentially that of our aforesaid co-pending application Serial No. 590,046. The accompanying drawing shows that apparatus with some variation.

In that drawing: Fig. 1 is a diagrammatic view of our preferred apparatus; Fig. 2 is a fragmental diagrammatic view showing a modification of part of that apparatus; and Fig. 3 is another fragmental diagrammatic view, showing another modification.

The propane to be chlorinated is supplied by a valved pipe 10 and the chlorine by a valved pipe 11. The propane may if desired be diluted by an inert diluent, such as nitrogen, supplied by a pipe 9; but if so the diluent does not enter into the chemical reaction, although it does exert an effect on physical conditions, as by its capacity to absorb heat. This diluent is often desirable in the chlorination of propane; but is especially desirable to get a quick heating of the material to be chlorinated if such material consists wholly of 1-chloropropane, in which case the nitrogen supplied may be hot.

The proportions of the propane and the chlorine are desirably controlled to keep the chlorine present below that necessary for an explosive mixture.

The propane-supply pipe 10 and the chlorine-supply pipe 11 preferably lead to separate vaporizing and/or preheating coils 12 and 13 respectively, located in a suitable heating device 14; which is conveniently an ordinary bath of water or of molten salts according to the temperature desired. Ordinarily the propane and chlorine supplied are in liquid form, so that vaporization is necessary to get them into the gaseous phase in which we conduct our process; and desirably we preheat both the propane and the chlorine additionally in the coils 12 and 13, to raise them to a desired reaction temperature before mixing them. This is desirable to obtain a maximum proportion of 1-chloropropane as a monochloropropane, and of 1,3-dichloropropane as a dichloropropane; and to obtain these maximum proportions in thermal chlorination the temperature to which the gases are raised before being mixed should be at least 250° C., and desirably should be in the neighborhood of 500° C. or over. These optimum temperatures are usually lower than that in photochemical and in catalytic chlorination.

The propane and the chlorine, either or both heated if desired, desirably pass separately as gases to a reaction passage 16, where they are mixed at high velocity and react. The velocity of injection of one gas into the other, as has already been stated, is desirably greater than the speed of flame propagation of the chlorination reaction, and is usually of the order of fifty to a hundred miles per minute. The chlorine supplied is under sufficient pressure to produce this speed. The reaction tube 16 is desirably a crooked one, as is shown in Figs. 1 and 3, to create a turbulence which produces intimate diffusion of the propane and the chlorine in each other before any considerable chlorination has occurred, so that flame is effectively prevented and the formation of free carbon lessened and practically avoided. However, especially in photochemical or catalytic chlorination, the reaction passage may be in the form of a straight tube 16ª, as is shown in Fig. 2. The chlorine is injected into the reaction tube 16 or 16ª by one or more jets 15. A single jet is shown in Figs. 1 and 2, and a plurality of jets 15 in Fig. 3. When there are a plurality of such jets 15, they are desirably arranged at spaced points along the crooked reaction tube 16, as is clear from Fig. 3, so that the reaction of the chlorine injected at one jet may be completed or nearly so before the chlorine from the next jet is introduced. The reaction passage, especially if it is a crooked one as is the reaction passage 16 in Figs. 1 and 3, is desirably immersed in a bath 17, as of molten salts, to absorb the heat of the reaction, which is an exohthermic one; although if the chlorination is photochemical or catalytic, such bath 17 may be omitted, as in Fig. 2. Suitable burners 18 may be provided for heating the bath containing the coils 12 and 13, and for initially heating the heat-absorbing bath 17.

When the chlorination is to be a photochemical chlorination, suitable light-giving devices, such as incandescent bulbs 19, may be provided around the reaction tube 16a; and the reaction tube is made of some material, such as silica or glass, which permits the passage through its walls of the reaction-accelerating light. When the chlorination is to be catalytic, any suitable catalyst 20 may be put in the reaction tube 16a. Both photochemical and catalytic acceleration may be used, as is shown in Fig. 2. Various catalysts may be used, such as granular carbon, antimony chloride, stannic chloride, or other known chlorination catalysts. If desired, a plurality of reaction-accelerating expedients may be used, such as heat and light, or heat and a catalyst, or light and a catalyst, or light and heat and a catalyst. In general, the temperature of the reaction may be lowered if a catalyst or light is used to accelerate the recation.

The reaction products, with any recycled unreacted propane, (for desirably there is an excess of propane so that the formation of trichlorides and more highly chlorinated products is minimized,) pass from the reaction tube 16 or 16a immediately to the worm 21 of a cooler 22; by which they are cooled quickly to a temperature in the neighborhood of room temperature. This immediate cooling lessens pyrolysis.

From the worm 21, the reaction products pass to the bottom of a water-scrubber 23, of any conventional form; in which the water takes up the hydrochloric acid present. This hydrochloric acid, and any condensed organic vapors, pass out from the bottom of the water-scrubber 23 by a pipe 24 to a separator 25; whence the hydrochloric acid is drawn off at one level, desirably into a container 26, for sale as a by-product, and the organic liquids are drawn off at another level and passed to an alkali-scrubber 27. The levels at which the hydrochloric acid and the organic liquids are drawn off respectively depends on which has the greater density, for the density of the organic liquids will depend upon whether monochlorides or polychlorides predominate; and so suitably valved pipes 28 and 29 are provided by which either liquid may be drawn off at a lower level and either at a higher level. Any vapors which rise in the water-scrubber 23 pass off from the top thereof through a pipe 30 to an alkali scrubber 31. The alkali scrubbers 27 and 31 are provided out of abundant caution to ensure the removal of all hydrochloric acid.

Valve pipes 32 and 33 from the outlets of the two alkali scrubbers 27 and 31 join each other, and lead to a rectifying column 34, of any suitable type. The temperatures in this rectifying column 34 are so controlled that the chlorinated hydrocarbons or mixed chlorides are condensed and pass as liquids to the bottom of the column, whence they may be drawn off through a pipe 35.

The unreacted propane, together with the inert diluent (such as nitrogen) if any is present, passes out at the top of the rectifying column 34, and is divided in conventional manner by a dephlegmator 36 and a wier-box 37 into reflux and take-off portions, which pass respectively by a valved reflux pipe 38 back to the rectifying column 34 and into a valved take-off pipe 39. The ration between reflux and take-off may be controlled by the valves 40 and 41 in these two pipes.

The take-off pipe 39 leads through a recycling pump 42 back to the propane-supply pipe 10; so that the unreacted propane may be recycled to cause its chlorination.

The chlorinated hydrocarbons or mixed chlorides drawn off by the pipe 35 may be supplied to a suitable storage receptacle 43 if desired, through a valved outlet 44. However, these chlorinated hydrocarbons are a mixture, and it is usually desirable to separate some from others. To this end, they may be passed through any desired number of rectifying columns 45, 46, 47, 48, etc., to get any desired separation. Usually there will be a plurality of rectifying columns, for getting additional separations; which may be varied at will, as will be clear from the following table of boiling points:

Monochlorides a. 2 Chloropropane, boils at 34.7° C.
b. 1 Chloropropane, boils at 46.8° C.

⟵ {Convenient 1st fractionation

Dichlorides c. 2,2-dichloropropane, boils at 67° C.
d. 1,1-dichloropropane, boils at 85°–87° C.
e. 1,2-dichloropropane, boils at 96.8° C. ⟵ {Convenient 2d fractionation
f. 1,3-dichloropropane, boils at 120°–121° C.

⟵ {Convenient 3d fractionation

Trichloropropanes g. 1,2,2-trichloropropane, boils at 123° C.
h. Other trichlorides, boil above 132° C.

Conveniently the first separation, in the column 45, will be between monochlorides and polychlorides, or between b and c. The monochlorides pass out at the top, and the polychlorides at the bottom. If desired, the mixed monochlorides, without further separation, may pass through a valved pipe 50 to a recycling pipe 51, provided with a recycling pump 52, for returning the mixed monochlorides to any convenient point in the propane-vaporizing-and-heating tube 12.

In some cases, however, the mixed monochlorides from the top of the rectifying column 45 are led to the rectifying column 46; which separates the two monochlorides. The 2-chloropopane passes out from the top of the rectifying column 46, and may be collected in a receptacle 53. The 1-chloropropane passes out from the bottom of the rectifying column 46, by a valved pipe 54 which leads to the recycling pipe 51. By closing the valve in the pipe 50 and opening the valve in the pipe 54, the recycling may be of the 1-chloropropane only, without contamination by the 2-chloropropane which can yield none of the desired 1,3-dichloropropane.

It is usually desirable to have a preheating device 63 in the pipe 51, for vaporizing and producing any desired pre-heating of the 1-chloropropane.

The mixed polychlorides from the bottom of the rectifying column 45 may pass to a rectifying column 47, in which a separation may be obtained on either side (speaking in terms of boiling-point sequence) of the desired 1,3-dichloropropane—that is, between e and f or between f and g, as desired. Conveniently, however, this separation is made between e and f; so that all three dichlorides except 1,3-dichloropropane will pass out at the top of the rectifying column 47, to be collected in a receptacle 55, while a mixture of the 1,3-dichloropropane with any trichlorides passes out at the bottom of the rectifying column 47. The amount of the trichlorides may be kept relatively small by the above-stated procedure of using a large excess of material to be chlorinated over chlorine, so that only a small proportion is chlorinated at each pass through the reactor. It is of course desirable also that the dichlorides should be rigorously removed from the material to be recycled. What trichlorides there are may be substantially separated from the desired 1,3-dichloropropane by the rectifying column 48; from which the trichlorides pass out from the bottom into a receptacle 56, while the 1,3-dichloropropane (trimethylene chloride) passes out at the top into a receptacle 57.

For simplification of illustration, the conventional dephlegmators and wier-boxes for separating the vapors which pass off at the top of a rectifying column into reflux and take-off portions are shown only in connection with one rectifying column (34), although ordinarily they would be used on all columns.

We desirably provide flowmeters 60 in the pipes 10, 11, 39 and 51, to give information which facilitates the control of the quantities of reactants supplied.

In operating our process, we usually maintain a constant supply of propane by the pipe 10. But that is not necessary; for the chlorination to get 1,3-dichloropropane may be of 1-chloropropane alone. Such 1-chloropropane, obtained from any desired source, may be supplied by way of a pipe 61 through suitable valves to either pipe 39 or pipe 51; so that by opening a valve in either pipe 10 and closing the desired valves in the pipes 10 and 54, it is possible to operate the system simply to chlorinate 1-chloropropane. In that case, the rectifying column 46 would normally be shut off, by closing the valve at its entrance. If unreacted 1-chloropropane is to be recycled the valve in the pipe 50 would be opened.

Ordinarily, however, as has already been stated, we prefer to provide a constant supply of propane, by way of the valved pipe 10; so that there will be simultaneous chlorination both of propane, mainly to the monochloropropanes, and of 1-chloropropane, mainly to the dichloropropanes, in the reaction tube.

We claim as our invention:—

1. The process of producing trimethylene chloride, which consists in subjecting a gas of the class consisting of propane and 1-chloropropane to a chlorination reaction with gaseous chlorine to yield trimethylene chloride and other chlorides of propane, and separating the trimethylene chloride from other chlorides.

2. The process of producing trimethylene chloride, which consists in chlorinating gaseous propane with gaseous chlorine to obtain a mixture of trimethylene chloride and other chlorides of propane, and separating the trimethylene chloride from other chlorides.

3. The process of producing trimethylene chloride, which consists in chlorinating gaseous 1-chloropropane with gaseous chlorine to obtain a mixture of trimethylene chloride and other chlorides of propane, and separating the trimethylene chloride from other chlorides.

4. The process of producing trimethylene chloride, which consists in subjecting a gas of the class consisting of propane and 1-chloropropane to a chlorination reaction with gaseous chlorine under thermal conditions which accelerate the reaction, to yield trimethylene chloride and other chlorides of propane, and separating the trimethylene chloride from other chlorides.

5. The process of producing trimethylene chloride, which consists in chlorinating gaseous propane with gaseous chlorine to yield monochlorides and polychlorides, separating 1-chloropropane from the polychlorides and from 2-chloropropane and recycling it to produce polychlorides, and separating trimethylene chloride from other polychlorides produced.

6. The process of producing trimethylene chloride, which consists in chlorinating gaseous propane with gaseous chlorine to yield monochlorides and polychlorides, separating 1-chloropropane from the polychlorides and recycling it to produce polychlorides, and separating trimethylene chloride from other polychlorides produced.

7. The process of producing trimethylene chloride, which consists in chlorinating gaseous propane with gaseous chlorine to yield monochlorides and polychlorides, separating the monochlorides from the polychlorides and recycling the monochlorides to produce polychlorides and separating trimethylene chloride from other polychlorides produced.

8. The process of producing trimethylene chloride, which consists in chlorinating gaseous propane with gaseous chlorine to yield monochlorides and polychlorides, separating unchlorinated propane and 1-chloropropane from the polychlorides and from 2-chloropropane and recycling said unchlorinated propane and said 1-chloropropane to chlorinate them by gaseous chlorine, and separating trimethylene chloride from other polychlorides produced.

9. The process of producing trimethylene chloride, which consists in chlorinating gaseous propane with gaseous chlorine to yield monochlorides and polychlorides, separating unchlorinated propane and 1-chloropropane from the polychlorides and recycling said unchlorinated propane and said 1-chloropropane to chlorinate them by gaseous chlorine, and separating trimethylene chloride from other polychlorides produced.

10. The process of producing trimethylene chloride, which consists in chlorinating gaseous propane with gaseous chlorine to yield monochlorides and polychlorides, separating unchlorinated propane and the monochlorides from the polychlorides and recycling said unchlorinated propane and said monochlorides to chlorinate them by gaseous chlorine, and separating trimethylene chloride from other polychlorides produced.

11. The process of chlorinating propane, which consists in separately preheating propane and chlorine to a temperature above 250° C., and mixing them in that heated condition to cause them to react, and then promptly cooling the products of the reaction.

12. The process of chlorinating propane, which consists in separately preheating propane to a temperature above 250° C., and mixing it in that heated condition with chlorine to cause its chlorination, and then promptly cooling the products of the reaction.

13. The process of chlorinating propane, which consists in separately preheating propane and chlorine to a temperature above 250° C., and mixing them in that heated condition to cause them to react, and then promptly cooling the products of the reaction; and effecting the mixing of the chlorine with the propane at a velocity above that of flame propagation under the conditions existing.

14. The process of chlorinating propane, which consists in separately preheating propane to a temperature above 250° C., and mixing it in that heated condition with chlorine to cause its chlorination, and then promptly cooling the products of the reaction; and effecting the mixing of the chlorine with the propane at a velocity above that of flame propagation under the conditions existing.

15. The process of chlorinating propane, which consists in separately preheating propane and chlorine to a temperature above 250° C., and mixing them in that heated condition to cause them to react.

16. The process of chlorinating propane, which consists in separately preheating propane to a temperature above 250° C., and mixing it in that heated condition with chlorine to cause its chlorination.

17. The process of chlorinating 1-chloropropane, which consists in vaporizing it, mixing it with a hot gaseous diluent so that such vaporized 1-chloropropane will be quickly brought to a desired reaction temperature, and mixing the mixture of 1-chloropropane and heated inert gaseous diluent with preheated chlorine to produce a reaction of the chlorine with the heated 1-chloropropane.

18. The process of chlorinating 1-chloropropane, which consists in vaporizing it, mixing it with a hot gaseous diluent so that such vaporized 1-chloropropane will be quickly brought to a desired reaction temperature, and mixing the mixture of 1-chloropropane and heated inert gaseous diluent with chlorine to produce a reaction of the chlorine with the heated 1-chloropropane.

19. The process of chlorinating 1-chloropropane, which consists in vaporizing it, mixing it with gaseous chlorine, and producing reactive conditions for the mixture.

20. The process of chlorinating 1-chloropropane, which consists in mixing it with chlorine, and subjecting the mixture to the action of light.

21. The process of producing trimethylene chloride, which consists in subjecting a gas of the class consisting of propane and 1-chloropropane to a chlorination reaction with gaseous chlorine under photochemical conditions which accelerate the reaction, to yield trimethylene chloride and other chlorides of propane, and separating the trimethylene chloride from other chlorides.

22. The process of producing trimethylene chloride, which consists in subjecting a gas of the class consisting of propane and 1-chloropropane to a chlorination reaction with gaseous chlorine under catalytic conditions which accelerate the reaction, to yield trimethylene chloride and other chlorides of propane, and separating the trimethylene chloride from other chlorides.

HENRY B. HASS.
EARL T. McBEE.